United States Patent [19]

Demuth et al.

[11] Patent Number: 5,348,772
[45] Date of Patent: Sep. 20, 1994

[54] USE OF AMINO GROUPS, OBTAINED ON A POLYMER MATERIAL BY AN ELECTRIC TREATMENT UNDER NITROGEN ATMOSPHERE, FOR ACCELERATING A GRAFTING REACTION

[75] Inventors: Odile Demuth, Ecully; Daniel Wattiez, Rouffac; Jacques Maguin, Lyon; Jean C. Brosse, Connerre; Fabienne Poncin-Epaillard; Bruno Chevet, both of Le Mans, all of France

[73] Assignee: Institut Textile de France, France

[21] Appl. No.: 892,185

[22] Filed: Jun. 2, 1992

[30] Foreign Application Priority Data

Jun. 10, 1991 [FR] France ................. 91 06829

[51] Int. Cl.$^5$ .................. B05D 3/06; B05D 3/02; B05D 1/36
[52] U.S. Cl. .................. 427/536; 427/538; 427/393.5; 427/412.1; 427/412.3
[58] Field of Search .......... 427/536, 538, 540, 535, 427/384, 393.5, 412.3, 412.1, 430.1

[56] References Cited

U.S. PATENT DOCUMENTS

| | | | |
|---|---|---|---|
| 3,353,988 | 11/1967 | Wolinski | 427/540 |
| 3,361,587 | 1/1968 | Menikheim et al. | 427/536 |
| 3,639,134 | 2/1972 | Stegmeier et al. | 427/536 |
| 4,468,412 | 8/1984 | Fujii et al. | 427/536 |
| 4,606,930 | 8/1986 | Ueno et al. | 427/538 |
| 4,617,199 | 10/1986 | Galli et al. | 427/536 |
| 4,664,936 | 5/1986 | Ueno et al. | 427/538 |
| 4,678,681 | 7/1987 | Obayashi et al. | 427/538 |
| 5,183,701 | 2/1993 | Jacobs et al. | 427/538 |

FOREIGN PATENT DOCUMENTS 311197  4/1989  European Pat. Off. ............ 427/538

Primary Examiner—Marianne Padgett
Attorney, Agent, or Firm—Ladas & Parry

[57] ABSTRACT

The invention relates to the use of the amino groups created on the surface of a polymer material, such as a polypropylene film, by an electric treatment, notably a cold plasma, under nitrogen atmosphere, for accelerating the grafting of the polymer material by impregnating the latter with a bath containing a vinyl type unsaturated monomer comprising a carbonyl group in α of the double vinyl bond, such as an acrylic monomer.

6 Claims, 2 Drawing Sheets

USE OF AMINO GROUPS, OBTAINED ON A POLYMER MATERIAL BY AN ELECTRIC TREATMENT UNDER NITROGEN ATMOSPHERE, FOR ACCELERATING A GRAFTING REACTION

FIELD OF THE INVENTION

The present invention relates to the grafting of polymeric materials, such as films of polypropylene or polyester, with an unsaturated monomer, notably acrylic acid. More particularly, it relates to a grafting technique which comprises a first step of activating the surface of the polymeric material to be grafted, said first step allows for the creation of free radicals on the surface of said material. The first step is followed by a second step during which the activated material is placed in contact with the unsaturated monomer to be grafted.

BACKGROUND OF THE INVENTION

The aforementioned technique is known as postgrafting and is well known, particularly in the treatment of textile materials. This technique is particularly useful in conferring desired permanent properties to the polymeric material which is grafted. In document EP 0 299 808, for example, the treatment is intended for waterproofing the textile material.

There are many activation methods such as for example the action of ozone or of ammonium sulphate as in document EP 0 299 808. Further, the irradiation under inert atmosphere as disclosed in U.S. Pat. No. 3,912,499.

The activation may also be achieved by electric treatments said electric treatments being one of corona discharge or plasma. However, these type of treatments have certain limitations. For example, the action of the electric treatment may result in the creation of free radicals on the surface of the polymeric material, also stray reactions and in particular a certain amount of degradation of the macromolecular structure of the material and crosslinking reactions which modify the initial characteristics of the material. Consequently, if the material is to be protected against a deterioration caused by said stray reactions, the grafting rate obtained will necessarily be low resulting in grafting kinetics which are slow.

SUMMARY OF THE INVENTION

It is the aim of the present invention to overcome the aforesaid drawbacks by obtaining a higher grafting rate for a shorter activation time for at least certain types of the currently used grafting monomers.

This aim is unquestionably reached according to the invention, for grafting a polymeric material by impregnating that material in a bath containing an unsaturated monomer with a vinyl functionality comprising a carbonyl group in a position α to the double bond. Amino groups are grafted on the surface of said polymeric material, using an activation treatment prior to the grafting, said activation treatment is an electric treatment under nitrogen atmosphere. When the electric activation treatment is conducted under a nitrogen atmosphere, it causes the formation on the surface of the polymeric material free radicals which permits the development of the grafting reaction, and also the grafting of amino groups.

Heretofore, the presence of amino groups, just like the presence of the carbonyl or carboxyl groups obtained during the electric treatment under other atmospheres, has served to improve the wettability of the polymeric material.

The merit of the invention is the discovery whereby the presence of the amino groups procures a new technical effect when the material receiving such electric treatment is subjected to a grafting operation by impregnation in a bath containing a certain type of monomer. Namely, an unsaturated acrylic monomer with a carbonyl group in a position α to the double bond. Said new technical effect consists in speeding up the kinetics of grafting. The grafting rate is more important at the start of the grafting reaction, as there is a direct relationship between the grafting rate and the concentration of the amino groups created on the surface of the polymer material during the electric treatment. This phenomenon might be explained by supposing that, since the polymer material is insoluble in the impregnation bath containing the monomer, the amino groups created on the surface of the material by the electric treatment under nitrogen atmosphere act as a transfer agent and induce the monomers to diffuse towards the radical sites available on the surface of the polymer, thus improving the initiating and the propagation of the grafting reaction. Moreover, the carbonyl group in of the vinyl bond tends to form a hydrogen bond with the amino group fixed on the surface of the polymer, thus contributing to bring the double vinyl bond closer to the radical sites present on said surface.

Although the amino groups do not constitute radical sites which participate to the grafting reaction, they are supposed to constitute relay sites capable of accelerating the initiating and the propagation of said reaction.

The electric treatment which is used to create radical sites and amino groups on the surface of the polymeric material consists in particular of a treatment, under nitrogen atmosphere, by cold plasma. The cold plasma is a low-ionized medium with a high thermodynamic unbalance, which is obtained by electric treatment with or without electrodes, in a gas under low pressure said measure being less than 100 mbar. For example, electrical discharges, microwave discharges or high frequency.

Preferably, the unsaturated monomer having a carbonyl group in a position α to the double bond is an acrylic monomer, such as for example acrylic acid, in diluted aqueous solution.

Preferably, the grafting reaction in this latter case, occurs at a temperature comprised between 70° and 95° C. for time periods varying between about 24 and 48 hours.

Preferably, the electric treatment is carried out in the following conditions: power of the discharge between 30 W and 100 W; time of exposure of the polymer material placed in the visible part of the plasma, between 1.5 and 3 minutes.

Preferably, the polymer material is a polypropylene or a polyester, for example in film form.

BRIEF DESCRIPTION OF THE DRAWINGS

The invention will be more readily understood on reading the following description of an embodiment of the grafting of a polypropylene film by cold plasma under nitrogen atmosphere, using an acrylic acid monomer, illustrated in the appended drawing, in which.

DETAILED DESCRIPTION OF PREFERRED EMBODIMENT

Figure 1:
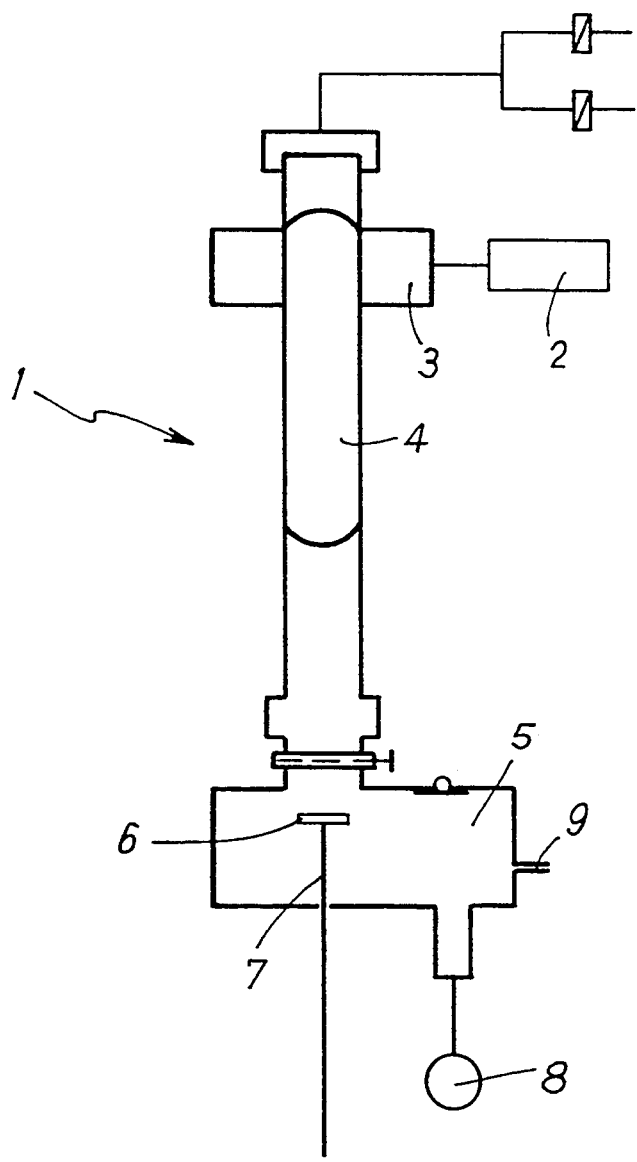
FIG. 1 is a diagrammatical view of the installation of treatment by microwave plasma.

The installation 1 for creating a microwave plasma is a conventional one and will not be described in detail. The installation 1 described herein, is a laboratory installation for treating small size samples. It comprises a microwave generator 2, working at a frequency of 433 MH$_z$, coupled to a surfatron 3. The excitation power can vary from 0 to 250 W. It further comprises a reactor 4 which is a quartz cylinder of 500 mm length and 75 mm diameter. The reactor is placed above a chamber 5, used for introducing the sample to be treated 6. The sample support 7 can be moved in the zone of plasma or outside it. The installation 1 further comprises a pumping system 8, for varying the vacuum inside the reactor 4. The chamber 5 is connected to a nitrogen supply 9, of which the flowrate is controlled.

The sample placed on the support 7 is a polypropylene film of 15 cm$^2$. The polypropylene is an isotactic and semi-crystalline polypropylene having a mean molecular mass of 50,000 and a mean degree of polymerization of 1,200. The thickness of the film is about 100 μm; it is obtained by extrusion and without additive.

The treatment conditions are as follows: Incident power iP=50 W, reflected power rP=0.02 W, nitrogen flowrate N$_2$Fr=20-cm$^3$/min., plasma length=13 cm, and distance between the bottom of the surfatron and the surface of the sample=5 cm. Various measurements were made in these conditions, while varying the activation time of 1 to 12 mins. and following the steps indicated below:

pumping up to $10^{-5}$ mbar for 30 mins.,
introducing the nitrogen for 5 mins.,
closing the valve 10, and introducing the sample 6 into the chamber 5,
pumping up to $10^{-2}$ mbar for 7.5 mins.,
opening the valve 10,
pumping up to $10^{-5}$ mbar for 7.5 mins.,
creating plasma during test time T.

The presence of free radicals was measured, using the 2,2-diphenyl-l-picrylhydrazyl (DPPH, Aldrich) according to a method which has been described in Eur. Polym. Journal 26(8), page 333 (1990).

The presence of the amino groups was measured according to the method known as R. E. Allred Process which has been the subject matter of a conference at the ACS Symposium Composites, Interfaces held in March 1983 in Seattle.

The sample 6 treated under nitrogen plasma is dipped into a solution of acrylic acid at 5% by weight in 2-butanol. Said solution is heated to 95° for 48 hours. The homopolyacrylic acid is separated from the grafted part with a soxhlet type extraction apparatus for 2 days.

The grafting rate is measured by infra-red and by scintigraphy.

Figure 2:
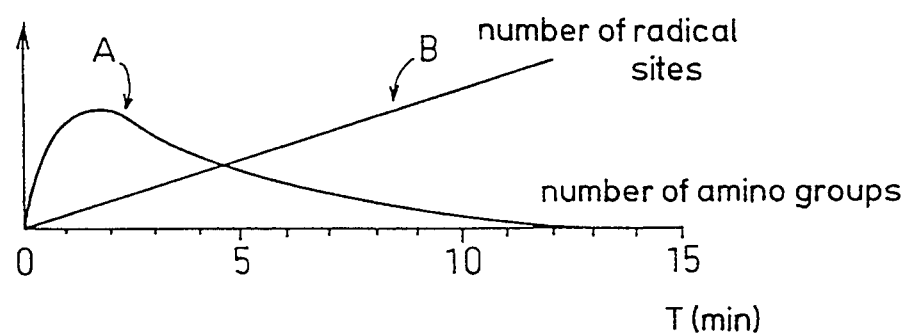
FIG. 2 is a diagram in the form of two curves (A) and (B) showing the evolution of the creation of the amino groups and radical sites on the surface of the polypropylene as a function of the activation time, in minutes (min.)

It is clear from FIG. 2, that the creation of the amino groups (A) starts off at a quick rate and decreases after a few minutes, whereas the creation of the radical sites (B) is directly proportional to time.

All the studies conducted heretofore on the evolution of the grafting rate as a function of the activation time have found that there is a linear dependence between the grafting rate and the quantity of created free radicals accessible to the monomers. Such studies are particularly concerned with grafting the acrylamide on polypropylene and on polyethylene activated by an argon plasma and with grafting the acrylamide on polypropylene activated by U.V. rays.

Figure 3:
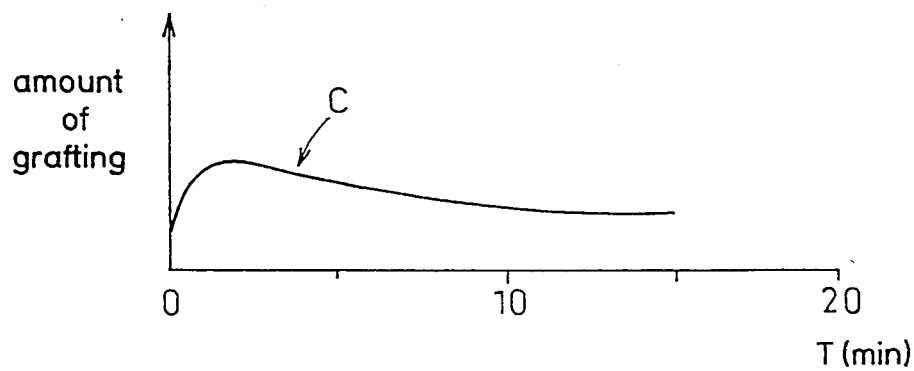
FIG. 3 is a diagram in the form of one curve (C) showing the evolution of the grafting rate as a function of the activation time.

Now, quite unexpectedly, the curve (C) of FIG. 3 shows that in the aforesaid conditions, in the presence of nitrogen which creates amino groups, the grafting rate is not within the linear dependence of the quantity of free radicals. Grafting kinetics are very strongly accelerated from the start of the activation and during the first minutes, due to the presence of the amino groups.

It is therefore possible to obtain a given grafting rate with a shorter activation time.

In the present text, the term "electric treatment" includes both the electric treatments proper, which only use electric currents, and the electromagnetic treatments—such as corona discharge and plasma—which use, not only electric currents, but also magnetic currents.

What is claimed is:

1. A process for accelerating grafting of a polymeric material by impregnating said polymeric material in a bath containing an unsaturated monomer, said unsaturated monomer containing a vinyl functionality and comprising a carbonyl group in a position α to the double bond of said vinyl functionality, wherein said polymeric material is electrically treated in a nitrogen atmosphere at a frequency of 433 MHz in order to create amino groups on the surface of said polymeric material.

2. The process of claim 1, wherein the polymeric material is polypropylene.

3. The process of claim 1, wherein the electric treatment is cold plasma under nitrogen atmosphere.

4. The process of claim 1, wherein the electric treatment is carried out in the following conditions: discharge power between 30 and 100 W, time of exposure of the polymeric material placed in the visible part of the plasma between 1.5 and 3 minutes.

5. The process of claim 1, wherein the unsaturated monomer is an acrylic monomer.

6. The process of claim 5, wherein the grafting occurs at a temperature between 70° and 95° C. for time periods varying between 24 and 48 hours.

* * * * *

UNITED STATES PATENT AND TRADEMARK OFFICE
CERTIFICATE OF CORRECTION

PATENT NO. : 5,348,772
DATED      : September 20, 1994
INVENTOR(S) : Odile DEMUTH et al It is certified that error appears in the above-identified patent and that said Letters Patent is hereby corrected as shown below:

Title page, item [30]:    Delete "91 06829" & insert --91 06828--.

Signed and Sealed this

Twenty-ninth Day of November, 1994

Attest:

BRUCE LEHMAN

*Attesting Officer*    *Commissioner of Patents and Trademarks*